US010618382B2

(12) United States Patent
Jeong et al.

(10) Patent No.: US 10,618,382 B2
(45) Date of Patent: Apr. 14, 2020

(54) AIR CONDITIONING SYSTEM FOR MOTOR VEHICLES

(71) Applicant: HANON SYSTEMS, Daejeon (KR)

(72) Inventors: Jae Won Jeong, Daejeon (KR); Seo Jun Yoon, Daejeon (KR); Soon Rae Hong, Daejeon (KR); Seong Seok Han, Daejeon (KR); Yong Ho Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 100 days.

(21) Appl. No.: 15/984,526

(22) Filed: May 21, 2018

(65) Prior Publication Data

US 2018/0264915 A1  Sep. 20, 2018

Related U.S. Application Data

(63) Continuation-in-part of application No. 15/109,868, filed as application No. PCT/KR2014/011797 on Dec. 4, 2014, now Pat. No. 10,000,110.

(30) Foreign Application Priority Data

Jan. 20, 2014 (KR) .................... 10-2014-0006596
Jan. 20, 2014 (KR) .................... 10-2014-0006604
Jan. 20, 2014 (KR) .................... 10-2014-0006605

(51) Int. Cl.
*B60H 1/32* (2006.01)
*B60H 1/00* (2006.01)

(52) U.S. Cl.
CPC ....... *B60H 1/3233* (2013.01); *B60H 1/00514* (2013.01); *B60H 1/00571* (2013.01)

(58) Field of Classification Search
CPC .............. B60H 1/3233; B60H 1/00514; B60H 1/00571

See application file for complete search history.

(56) References Cited

U.S. PATENT DOCUMENTS

| 5,816,298 A | 10/1998 | Stricklin et al. | |
| 2009/0151384 A1* | 6/2009 | Lee ..................... | B60H 1/3233 62/285 |
| 2009/0211658 A1* | 8/2009 | Kaden ................ | B60H 1/00557 138/109 |

FOREIGN PATENT DOCUMENTS

| EP | 1645477 | * | 10/2004 |
| JP | 10089720 | | 4/1998 |
| JP | 2001153391 A | | 6/2001 |
| JP | 2004245570 A | * | 9/2004 |
| JP | 2004245570 A | | 9/2004 |
| JP | 2008121898 A | | 5/2008 |
| JP | 2011106604 A | | 6/2011 |
| KR | 200444138 Y1 | | 4/2009 |

(Continued)

*Primary Examiner* — Emmanuel E Duke
(74) *Attorney, Agent, or Firm* — Shumaker, Loop & Kendrick, LLP; James D. Miller

(57) ABSTRACT

An air conditioning system for motor vehicles includes an air conditioner case, an evaporator installed inside the air conditioner case, a drainage hose configured to discharge condensate water generated in the evaporator to the outside of a vehicle room, the drainage hose connected to a drainage port of the air conditioner case and drawn out to the outside of the vehicle room through a dashboard, and a connector part configured to rotatably connect the drainage hose to the drainage port of the air conditioner case.

11 Claims, 18 Drawing Sheets

(56) References Cited

FOREIGN PATENT DOCUMENTS

| KR | 20090012970 U | 12/2009 |
|----|---------------|---------|
| KR | 20120094246 A | 8/2012 |
| KR | 20120134316 A | 12/2012 |
| KR | 20130007113   | 12/2013 |

* cited by examiner

AIR CONDITIONING SYSTEM FOR MOTOR VEHICLES

CROSS-REFERENCE TO RELATED PATENT APPLICATIONS

This patent application is a continuation-in-part patent application of U.S. patent application Ser. No. 15/109,868 filed on Jul. 6, 2016 which is a U.S. National Phase patent application of PCT/KR2014/011797 filed Dec. 4, 2014 which claims priority to KR 10-2014-0006596 filed Jan. 20, 2014, KR 10-2014-0006604 filed on Jan. 20, 2014, and KR 10-2014-0006605 filed Jan. 20, 2014, the disclosure of each of which is incorporated herein by reference in its entirety.

TECHNICAL FIELD

The present invention relates to an air conditioning system for motor vehicles. More particularly, the present invention pertains to an air conditioning system for motor vehicles which is capable of preventing a twisting phenomenon of a condensate water drainage hose in the course of assembling the condensate water drainage hose.

BACKGROUND ART

A motor vehicle is provided with an air conditioning system for cooling or heating the interior of a vehicle room. As shown in FIG. 1, an air conditioning system includes an air conditioner case 10 and an evaporator 12 installed in the air conditioner case 10. The evaporator 12 is installed in an internal passage 10a of the air conditioner case 10 and is configured to cool an air blown along the internal passage 10a. This enables a cooled air to be introduced into a vehicle room.

The air conditioning system further includes a drainage device 20 configured to discharge condensate water generated on the surface of the evaporator 12. The drainage device 20 includes a hopper-type bottom surface 22 of the air conditioner case 10 configured to receive and collect condensate water falling from the evaporator 12, a drainage port 24 configured to drain the collected condensate water falling on the bottom surface 22 to the outside, and a drainage hose 26 configured to guide and discharge the condensate water drained from the drainage port 24 to the outside of the vehicle room.

The drainage hose 26 extends to the outside of the vehicle room through a through-hole 32 of a dashboard 30. The drainage hose 26 serves to discharge the condensate water drained from the drainage port 24 to the outside of the vehicle room.

Typically, when assembling the drainage hose 26, the base end portion 26a of the drainage hose 26 is fitted to the drainage port 24 of the air conditioner case 10. The distal end portion 26b of the drainage hose 26 is inserted into the through-hole 32 of the dashboard 30 and is drawn to the outside of the dashboard 30. Finally, the distal end portion 26b of the drainage hose 26 is pulled outside the dashboard 30.

In the course of pulling and drawing out the distal end portion 26b of the drainage hose 26 outside the dashboard 30, the drainage hose 26 may be distorted and twisted. This poses a problem in that the drainage hose 26 is clogged due to the twisting phenomenon thereof.

Particularly, the twisting phenomenon of the drainage hose 26 occurs mostly inside the dashboard 30. In this case, a worker who conducts a drawing work outside the dashboard 30 cannot recognize occurrence of the twisting phenomenon of the drainage hose 26. Thus, the drainage hose 26 may be assembled in a twisted state. This leads to a problem in that poor assembly of the drainage hose 26 occurs.

Consequently, there is a possibility that the inner diameter of the drainage hose 26 is reduced or the drainage hose 26 is clogged. As a result, the condensate water is not smoothly drained and the leakage of condensate water may be generated.

SUMMARY OF THE INVENTION

Problems to be Solved

In view of the aforementioned problems inherent in the related art, it is an object of the present invention to provide an air conditioning system for motor vehicles which is capable of preventing a twisting phenomenon of a drainage hose in the course of assembling the drainage hose.

Another object of the present invention is to provide an air conditioning system for motor vehicles which is configured to prevent a twisting phenomenon of a drainage hose in the course of assembling the drainage hose and which is capable of reliably preventing a clogging phenomenon of the drainage hose attributable to the twist of the drainage hose and the resultant leakage of condensate water.

Technical Solutions

In order to achieve the above objects, there is provided an air conditioning system for motor vehicles, including: an air conditioner case having a drainage port; an evaporator installed within the air conditioner case; a drainage hose configured to discharge condensate water generated in the evaporator to the outside of a vehicle room, the drainage hose connected to the drainage port and drawn out to the outside of the vehicle room through a dashboard, and a connector means configured to rotatably connect the drainage hose to the drainage port of the air conditioner case so as to permit rotation of the drainage hose with respect to the drainage port when the drainage hose is twisted in an assembling process of the drainage hose.

In order to achieve the above objects, there is provided an air conditioning system for motor vehicles, comprising: an air conditioner case; an evaporator installed inside the air conditioner case; a drainage hose configured to discharge condensate water generated in the evaporator to the outside of a vehicle room, the drainage hose connected to a drainage port of the air conditioner case and drawn out to the outside of the vehicle room through a dashboard; and a connector part configured to rotatably connect the drainage hose to the drainage port of the air conditioner case, wherein the connector part includes a connector configured to connect the drainage hose to the drainage port, a rotation guiding projection formed in one of the drainage port and the connector, and a rotation guiding rail formed in the other of the drainage port and the connector and configured to circumferentially slidably engage with the rotation guiding projection while making point-to-point contact with the rotation guiding projection, and the rotation guiding projection and the rotation guiding rail are configured so that when the drainage hose is twisted in the course of coupling the drainage hose, the rotation guiding projection and the rotation guiding rail make sliding movement with each other to allow the connector and the drainage hose to rotate with respect to the drainage port.

In the air conditioning system, the rotation guiding projection may be formed in the drainage port, and the rotation guiding rail may be formed in a portion of the connector corresponding to the rotation guiding projection.

In the air conditioning system, the rotation guiding projection may be formed in the connector, and the rotation guiding rail may be formed in a portion of the drainage port corresponding to the rotation guiding projection.

In the air conditioning system, the connector may include an opening portion formed by cutting out a portion of the connector, and the opening portion may be configured to permit elastic deformation of the connector to assist sliding movement of the rotation guiding projection and the rotation guiding rail when the rotation guiding projection and the rotation guiding rail make sliding movement.

Advantageous Effects

According to the present air conditioning system for motor vehicles, the drainage hose is rotatably assembled with the air conditioner case. Thus, there is provided an effect of being able to actively cope with a situation where the drainage hose is twistingly rotated in the process of drawing out and assembling the drainage hose outside the vehicle room.

Furthermore, since it is possible to actively cope with the situation where the drainage hose is twistingly rotated in the process of drawing out and assembling the drainage hose outside the vehicle room, there is provided an effect of being able to reliably prevent a twisting phenomenon of the drainage hose which may otherwise be generated when the drainage hose is twistingly rotated in the process of assembling the drainage hose.

Furthermore, since it is possible to prevent the twisting phenomenon of the drainage hose in the process of assembling the drainage hose, there is provided an effect of being able to reliably prevent a clogging phenomenon of the drainage hose attributable to the twist of the drainage hose and the resultant leakage of condensate water.

In addition, the drainage hose is rotatably assembled with the drainage port of the air conditioner case through the connector. The connection portion between the drainage port of the air conditioner case and the connector, from which water may be leaked, is water-tightly sealed by the seal means. Thus, there is provided an effect of being able to reliably prevent leakage of water from between the drainage port of the air conditioner case and the connector.

MODE FOR CARRYING OUT THE INVENTION

Figure 1:
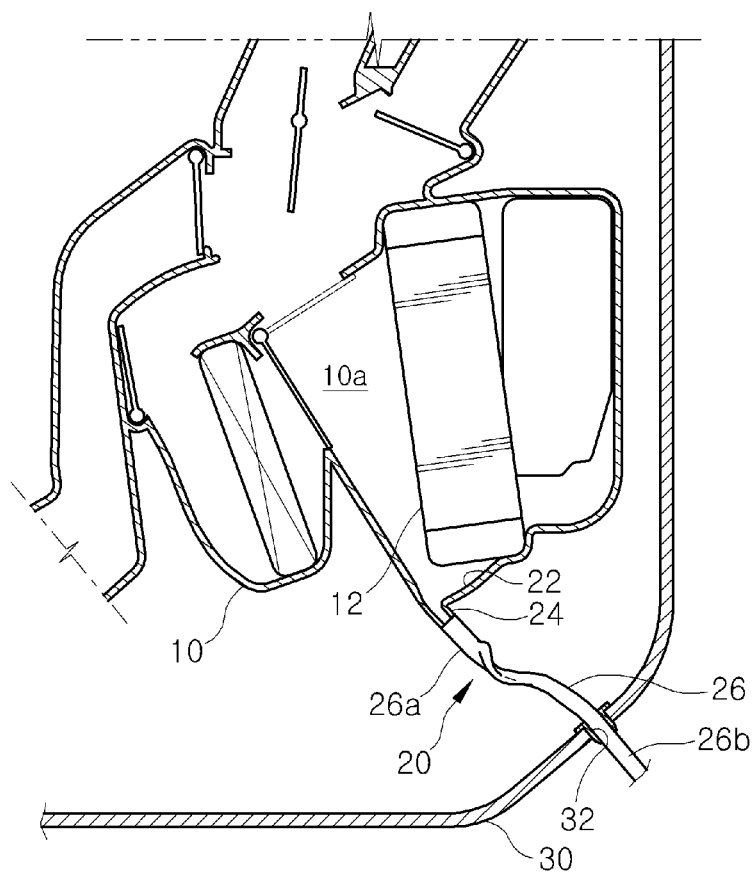
FIG. 1 is a sectional view showing a conventional air conditioning system for motor vehicles.

Preferred embodiments of an air conditioning system for motor vehicles according to the present invention will now be described in detail with reference to the accompanying drawings. Components similar to those of the related art described earlier will be designated by like reference symbols.

First Embodiment

Prior to describing features of an air conditioning system for motor vehicles according to the present invention, an air conditioning system for motor vehicles will be briefly described with reference to FIG. 2.

The air conditioning system includes an air conditioner case 10 and an evaporator 12 installed in the air conditioner case 10. The evaporator 12 is installed in an internal passage 10a of the air conditioner case 10 and is configured to cool an air blown along the internal passage 10a.

The air conditioning system further includes a drainage device 20 configured to discharge condensate water generated on the surface of the evaporator 12. The drainage device 20 includes a hopper-type bottom surface 22 of the air conditioner case 10 configured to receive and collect condensate water falling from the evaporator 12, a drainage port 24 configured to drain the collected condensate water falling on the bottom surface 22 to the outside, and a drainage hose 26 configured to guide and discharge the condensate water drained from the drainage port 24 to the outside of the vehicle room.

The drainage hose 26 extends to the outside of the vehicle room through a through-hole 32 of a dashboard 30. The drainage hose 26 serves to discharge the condensate water drained from the drainage port 24 to the outside of the vehicle room.

Typically, when assembling the drainage hose 26, the base end portion 26a of the drainage hose 26 is fitted to the drainage port 24 of the air conditioner case 10. The distal end portion 26b of the drainage hose 26 is inserted into the through-hole 32 of the dashboard 30 and is drawn to the outside of the dashboard 30. Finally, the distal end portion 26b of the drainage hose 26 is pulled outside the dashboard 30.

Next, features of the air conditioning system for motor vehicles according to the present invention will be described in detail with reference to FIGS. 2 to 7.

The air conditioning system according to the present invention includes a drainage port 24 of the drainage device 20. A rotation guiding projection 40 is formed on the outer circumferential surface of the drainage port 24. The rotation guiding projection 40 is formed to protrude from the outer circumferential surface of the drainage port 24. Although a plurality of rotation guiding projections may be formed on the outer circumferential surface of the drainage port 24, it is preferred that one rotation guiding projection is formed on the outer circumferential surface of the drainage port 24.

Figure 4:
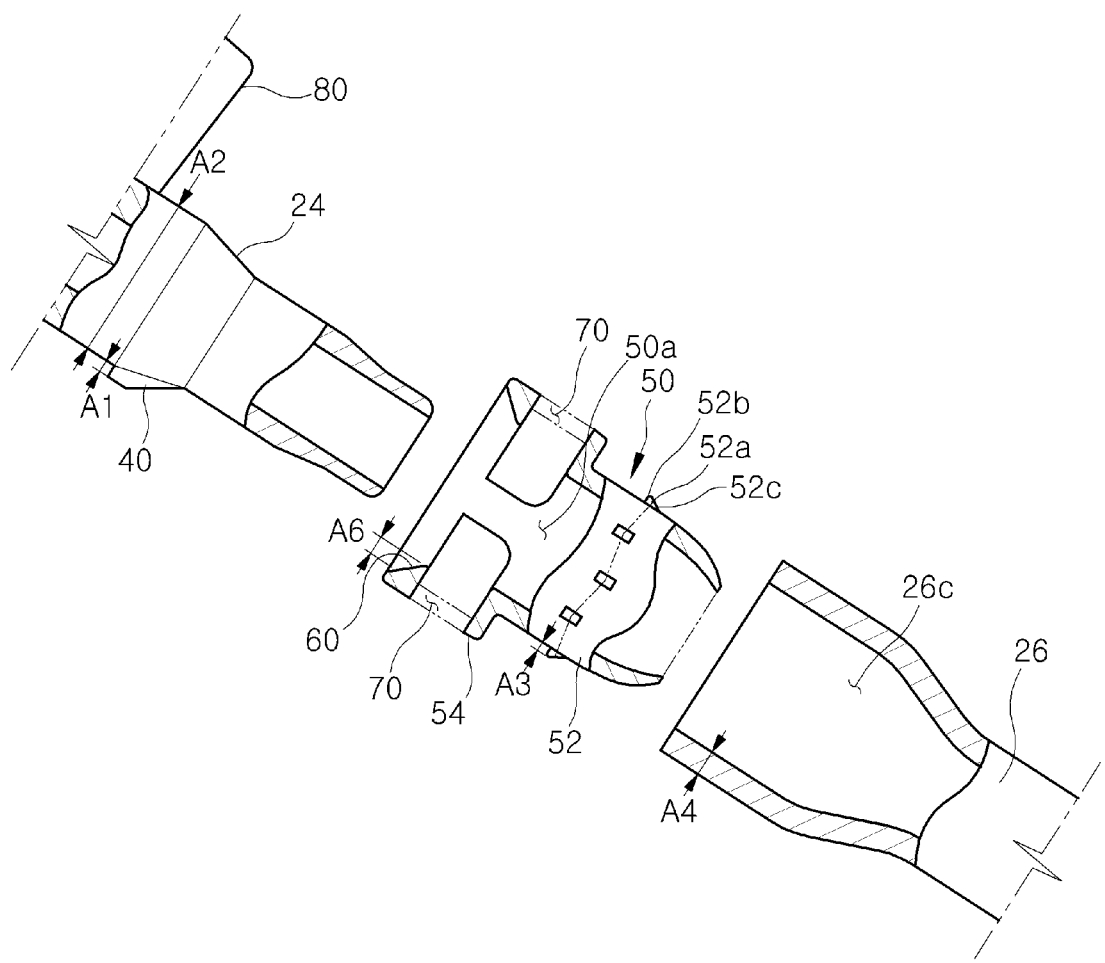
FIG. 4 is an enlarged sectional view illustrating a state in which a drainage port, a connector and a drainage hose, as major characterizing parts of the first embodiment, are exploded.

As illustrated in FIG. 4, the rotation guiding projection 40 protrudes from the outer circumferential surface of the drainage port 24 so that the protrusion height A1 thereof becomes equal to 1.5/10 of the outer diameter A2 of the drainage port 24.

Referring again to FIGS. 2 to 7, the air conditioning system according to the present invention includes a connector 50 configured to rotatably connect the drainage hose 26 to the drainage port 24. The connector 50 is a tubular body having a bore 50a. The connector 50 includes a hose connection portion 52 formed at one end thereof and a port connection portion 54 formed at the other end thereof.

The hose connection portion 52 is fitted to a bore 26c of the drainage hose 26. A plurality of coupling projections 52a is formed on the outer circumferential surface of the hose connection portion 52. The coupling projections 52a protrude radially outward from the outer circumferential surface of the hose connection portion 52. The coupling projections 52a are formed at regular intervals along the circumferential direction of the hose connection portion 52.

When the hose connection portion 52 of the connector 50 is fitted to the bore 26c of the drainage hose 26, the coupling projections 52a engage with the inner circumferential surface of the drainage hose 26, thereby increasing the coupling force between the drainage hose 26 and the hose connection portion 52. Specifically, the coupling projections 52a cut into and engage with the inner circumferential surface of the drainage hose 26 in the process of fitting the hose connection portion 52 into the bore 26c of the drainage hose 26. Thus, the coupling projections 52a enhance the coupling force between the drainage hose 26 and the hose connection portion 52. This prevents separation of the hose connection portion 52 of the connector 50 and the drainage hose 26.

Figure 7:
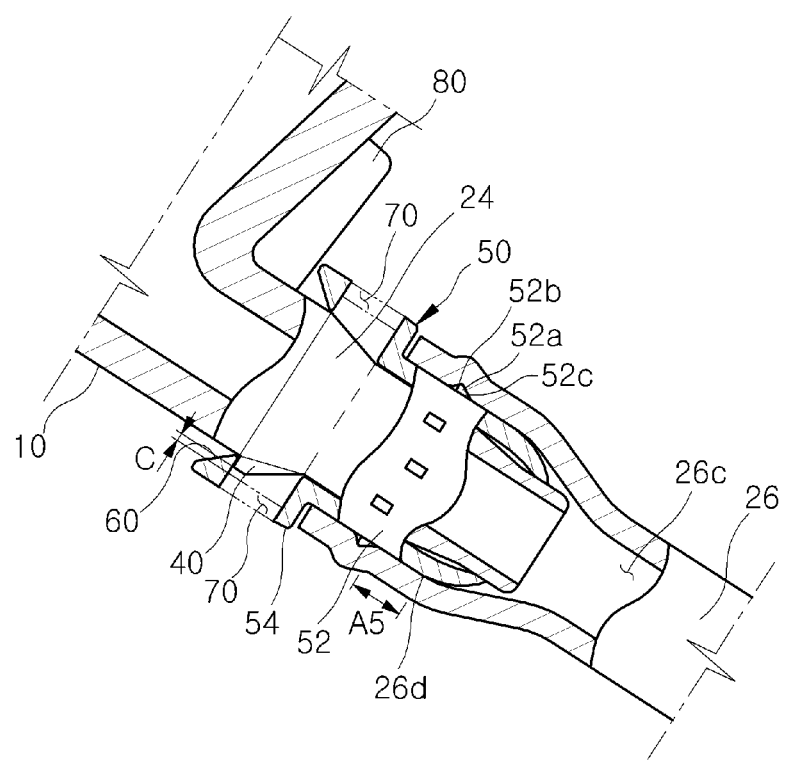
FIG. 7 is an enlarged sectional view illustrating a state in which the drainage port, the connector and the drainage hose, as major characterizing parts of the first embodiment, are assembled together.

As illustrated in FIGS. 4 and 7, it is preferred that the coupling projections 52a protruding from the outer circumferential surface of the hose connection portion 52 have a triangular cross section. More preferably, the coupling projections 52a may protrude from the outer circumferential surface of the hose connection portion 52 in a right-triangular cross section.

Each of the coupling projections 52a having a right-triangular cross section includes a slant side portion 52b and a perpendicular side portion 52c. The slant side portion 52b oriented in a coupling direction in which the hose connection portion 52 is coupled to the drainage hose 26. The perpendicular side portion 52c is oriented in a direction opposite to the coupling direction.

By employing this configuration, when the connector 50 is assembled with the drainage hose 26, the coupling projections 52a smoothly slide along the inner circumferential surface of the drainage hose 26, thereby assuring smooth assembly of the connector 50 and the drainage hose 26. After the connector 50 is assembled with the drainage hose 26, the coupling projections 52a make contact with the inner circumferential surface of the drainage hose 26 with a large friction force, thereby increasing the coupling force between the connector 50 and the drainage hose 26.

In addition, it is preferred that each of the coupling projections 52a protruding from the outer circumferential surface of the hose connection portion 52 has a sharp end portion. It is also preferred that the protruding height A3 of each of the coupling projections 52a is substantially equal to ⅓ of the wall thickness A4 of the drainage hose 26.

Furthermore, it is preferred that each of the coupling projections 52a protruding from the outer circumferential surface of the hose connection portion 52 is spaced apart by a distance A5 of at least 5 mm from the terminal end of the hose connection portion 52. More preferably, each of the coupling projections 52a may be spaced apart by a distance A5 of at least 5 mm from the terminal end of a contact section 26d of the hose connection portion 52 making contact with the drainage hose 26.

The coupling projections 52a are formed on the outer circumferential surface of the hose connection portion 52 at regular intervals along the circumferential direction and are arranged in a zigzag pattern along the circumferential direction.

By employing this configuration, it is possible to widen the arrangement area of the coupling projections 52a. This makes it possible to widen the friction contact area between the coupling projections 52a and the drainage hose 26 and to increase the coupling force between the coupling projections 52a and the drainage hose 26.

The reason for arranging the coupling projections 52a in the zigzag pattern is to prevent a portion of the drainage hose 26 from excessively expanding radially outward in the process of assembling the hose connection portion 52 and the drainage hose 26.

In a case where the coupling projections 52a are arranged in a line along the circumferential direction of the hose connection portion 52, a portion of the drainage hose 26 may be excessively expanded radially outward in the process of assembling the hose connection portion 52 and the drainage hose 26. This may make it difficult to assemble the hose connection portion 52 and the drainage hose 26.

If the coupling projections 52a are arranged in the zigzag pattern as in the present invention, the drainage hose 26 is sequentially expanded in the process of assembling the hose connection portion 52 and the drainage hose 26. Thus, the expansion amount of the drainage hose 26 is reduced. This makes it easy to assemble the hose connection portion 52 and the drainage hose 26. As a result, the ease of assembly of the drainage hose 26 is remarkably improved.

Referring again to FIGS. 2 to 7, the port connection portion 54 of the connector 50 is rotatably fitted to the outer circumferential surface of the drainage port 24. The port connection portion 54 includes a rotation guiding rail 60 formed on the inner circumferential surface thereof.

The rotation guiding rail 60 is one kind of protrusion rib protruding radially inward from the inner circumferential surface of the port connection portion 54 and extending along the circumferential direction. The rotation guiding rail 60 has a substantially triangular cross section.

When the port connection portion 54 of the connector 50 is fitted to the drainage port 24, the rotation guiding rail 60 slidably engages with the rotation guiding projection 40 of the drainage port 24. The rotation guiding rail 60 slidably engaging with the rotation guiding projection 40 connects the connector 50 to the drainage port 24 so that the connector 50 can rotate with reference to the drainage port 24.

Accordingly, the connector 50 and the drainage hose 26 coupled with the connector 50 can rotate with reference to the drainage port 24. This makes it possible to cope with the twist of the drainage hose 26 which may be twistingly rotated in the process of assembling the drainage hose 26.

In particular, it is possible to actively cope with the twist of the drainage hose 26 which may be twisted in the process of drawing out the drainage hose 26 outside the vehicle room. As a result, it is possible to reliably prevent a twisting phenomenon of the drainage hose 26. This makes it possible to reliably prevent a clogging phenomenon of the drainage hose 26 attributable to the twist of the drainage hose 26 and a leakage phenomenon of condensate water attributable to the clogging phenomenon of the drainage hose 26.

As illustrated in FIG. 4, the rotation guiding rail 60 protrudes radially inward from the inner circumferential surface of the port connection portion 54 so that the protruding height A6 thereof is larger than the protruding height A1 of the rotation guiding projection 40 with respect to the outer circumferential surface of the drainage port 24.

By employing this configuration, when the port connection portion 54 of the connector 50 is fitted to the outer circumferential surface of the drainage port 24 as illustrated in FIG. 7, a gap C is formed between the inner circumferential surface of the port connection portion 54 and the rotation guiding projection 40 of the drainage port 24 due to the difference between the protruding heights A1 and A6 of the rotation guiding rail 60 and the rotation guiding projection 40. This makes it possible to prevent direct friction contact between the rotation guiding projection 40 of the drainage port 24 and the inner circumferential surface of the port connection portion 54.

The reason for preventing the direct friction contact between the rotation guiding projection 40 of the drainage port 24 and the inner circumferential surface of the port connection portion 54 is to minimize the friction contact force between the drainage port 24 and the connector 50, thereby allowing smooth rotation of the connector 50.

It is preferred that the gap C between the rotation guiding projection 40 of the drainage port 24 and the inner circumferential surface of the port connection portion 54 of the connector 50 is equal to 1/10 of the outer diameter A2 of the drainage port 24.

In the present embodiment, the rotation guiding projection 40 is formed in the drainage port 24. The rotation guiding rail 60 is formed in the connector 50. The relative rotational movement between the drainage port 24 and the connector 50 is guided using the rotation guiding projection 40 and the rotation guiding rail 60. Alternatively, if necessary, the rotation guiding rail 60 may be formed in the drainage port 24. The rotation guiding projection 40 may be formed in the connector 50. The relative rotational movement between the drainage port 24 and the connector 50 can be guided using the rotation guiding rail 60 and the rotation guiding projection 40 thus formed.

It is preferred that the rotation guiding projection 40 is formed in the drainage port 24 and the rotation guiding rail 60 is formed in the connector 50 so that the relative rotational movement between the drainage port 24 and the connector 50 is guided by the rotation guiding projection 40 and the rotation guiding rail 60. The reason is that if he rotation guiding projection 40 is formed in the connector 50 as a rotating body, the rotation guiding projection 40 may be easily damaged or broken during the rotation of the connector 50.

By forming the rotation guiding projection 40 in the drainage port 24 as a fixed body, it is possible to suppress damage or breakage of the rotation guiding projection 40, thereby improving the durability thereof.

In the present embodiment, there has been described an example in which one rotation guiding projection 40 is formed in the drainage port 24. However, if necessary, a plurality of rotation guiding projections may be formed in the drainage port 24.

It is preferred that one rotation guiding projection 40 is formed in the drainage port 24. The reason is that as the number of rotation guiding projections increases, the contact area between the drainage port 24 and the connector 50 grows larger, eventually making it difficult for the connector 50 to rotate.

By forming one rotation guiding projection 40 in the drainage port 24, it is possible to enable smooth rotation of the connector 50 while not reducing the coupling force between the drainage port 24 and the connector 50.

Referring again to FIGS. 2 to 7, the air conditioning system of the present invention includes opening portions 70 formed in the port connection portion 54 of the connector 50. The opening portions 70 are formed to extend through the thickness of the connector 50 from the outer circumferential surface of the port connection portion 54. The opening portions 70 are formed in a pair along the circumferential direction of the port connection portion 54.

The opening portions 70 are symmetrically formed in the port connection portion 54 so as to face each other. The opening portions 70 are formed in the vicinity of the rotation guiding rail 60 of the port connection portion 54.

Since the opening portions 70 configured as above have a mutually-facing symmetrical structure, it is possible to easily secure the orientation of a mold when injection-molding the connector 50. Specifically, when injection-molding the internal parts of the port connection portion 54, for example, the rotation guiding rail 60, it is possible to easily secure the orientation of a mold for molding the rotation guiding rail 60. Accordingly, it is possible to facilitate the injection-molding of the connector 50, consequently improving the productivity of the connector 50.

In addition, since the opening portions 70 are formed in the vicinity of the rotation guiding rail 60, the region of the port connection portion 54 where the rotation guiding rail 60 is formed can be elastically deformed.

Accordingly, when the port connection portion 54 of the connector 50 is fitted to the outer circumferential surface of the drainage port 24, the port connection portion 54 is elastically deformed so that the port connection portion 54 of the connector 50 can be easily fitted to the outer circumferential surface of the drainage port 24.

In particular, when the rotation guiding rail 60 of the connector 50 is fitted to the drainage port 24 while making friction contact with the outer surface of the rotation guiding projection 40, the port connection portion 54 can be deformed radially outward in the rotation guiding rail 60. This makes it possible to improve the ease of assembly of the connector 50 with respect to the rotation guiding projection 40 of the drainage port 24. As a result, it is possible to improve the ease of assembly of the connector 50.

In addition, the opening portions 70 permits elastic deformation of the connector 50 when sliding movement occurs between the rotation guiding projection 40 and the rotation guiding rail 60 due to the rotation of the connector 50 with respect to the drainage port 24.

This reduces a frictional force between the rotation guiding projection 40 and the rotation guiding rail 60, thereby assisting the sliding movement between the rotation guiding projection 40 and the rotation guiding rail 60.

Figure 5:
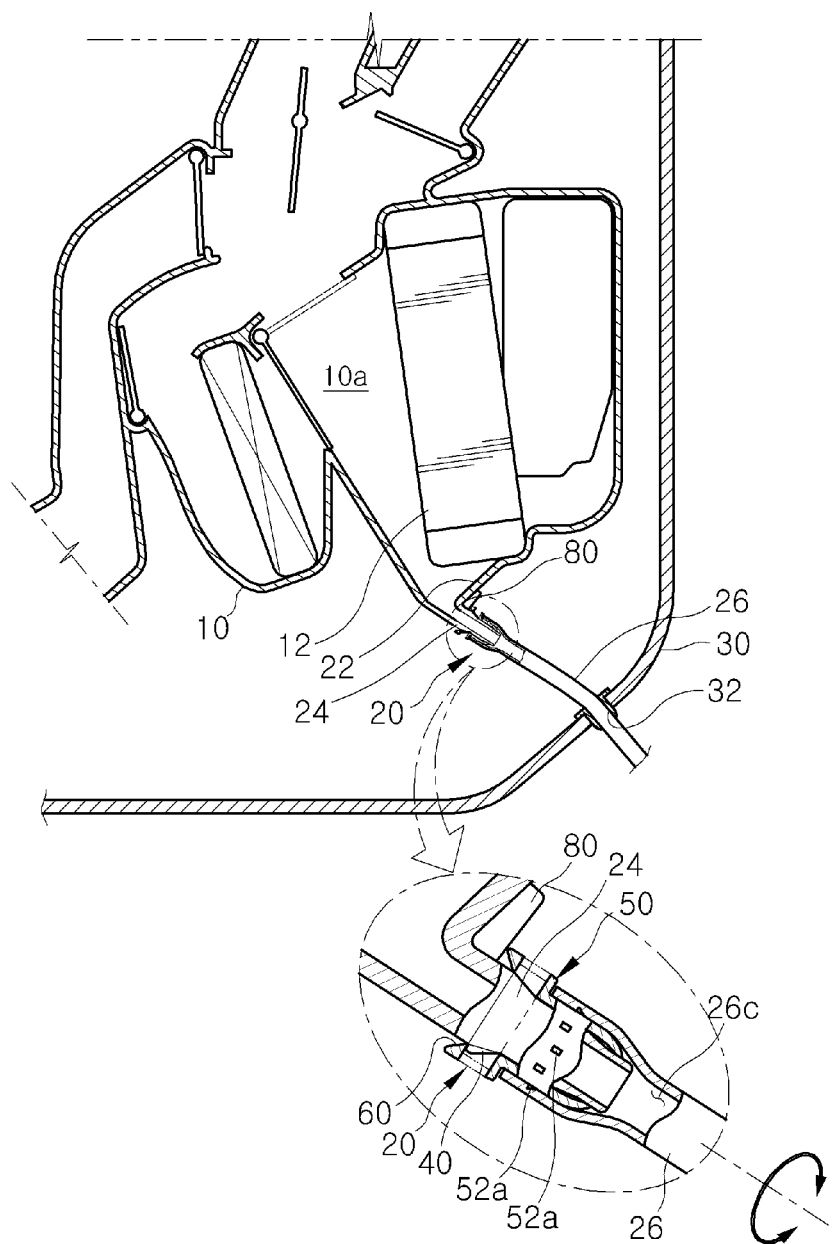
FIG. 5 is a sectional view illustrating a state in which the drainage port, the connector and the drainage hose illustrated in FIG. 2 are assembled together.
Figure 6:
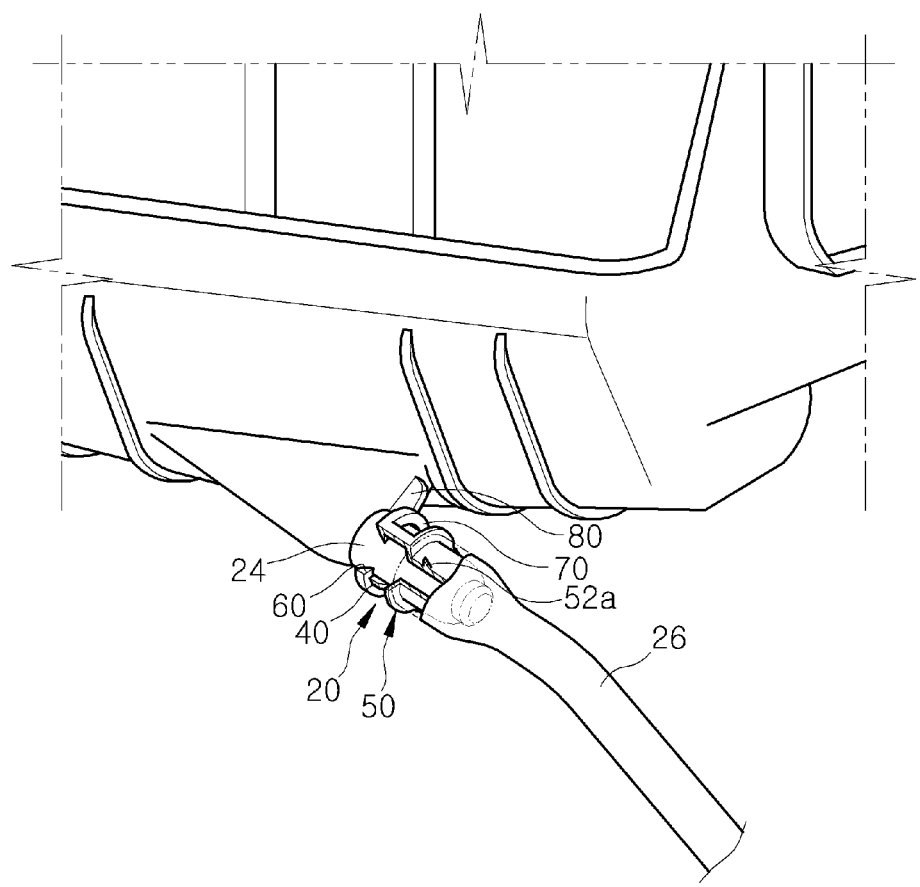
FIG. 6 is a perspective view illustrating a state in which the drainage port, the connector and the drainage hose illustrated in FIG. 2 are assembled together.

Referring again to FIGS. 2 to 7, the air conditioning system of the present invention includes a stopper 80 formed in the drainage port 24. The stopper 80 is formed on the outer circumferential surface of the drainage port 24. As illustrated in FIGS. 5 and 7, the stopper 80 is configured such that the end portion of the connector 50 fitted to the drainage port 24 collides and interferes with the stopper 80. Specifically, the stopper 80 is disposed such that the end portion of the connector 50 fitted to the rotation guiding projection 40 of the drainage port 24 collides and interferes with the stopper 80.

When the connector 50 temporarily fitted to drainage port 24 is moved toward the stopper 80 beyond a right assembly position in an insertion direction, the stopper 80 interferes with the connector 50, thereby restraining the movement of the connector 50. Thus, the stopper 80 prevents the connector 50 from being excessively fitted to the outer circumferential surface of the drainage port 24 when the connector 50 is assembled with the drainage port 24. This makes it possible to prevent inaccurate assembly of the connector 50 and the resultant locking of the connector 50. Thus, the stopper 80 assists in enabling smooth rotation of the connector 50.

Next, an operation example of the air conditioning system configured as above will be described with reference to FIGS. 2 to 7.

Figure 2:
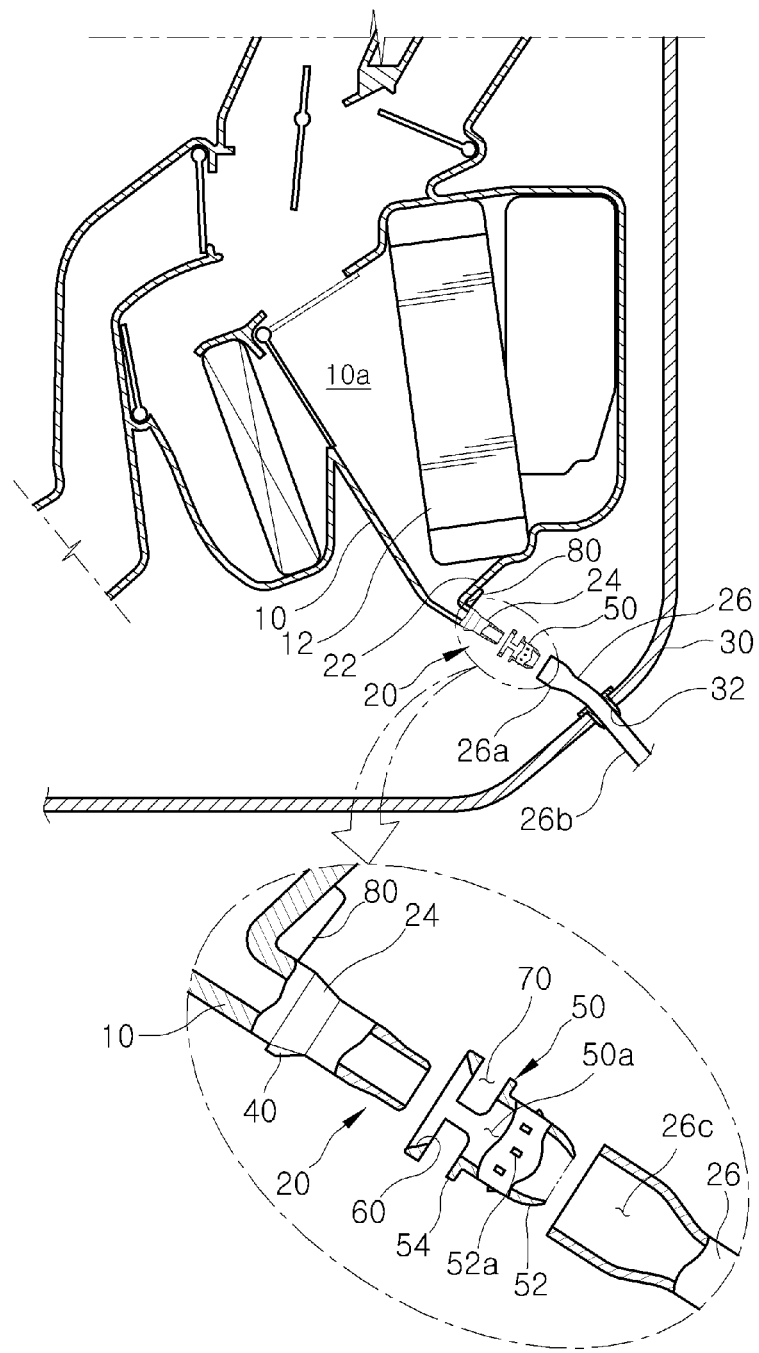
FIG. 2 is a sectional view illustrating an air conditioning system for motor vehicles according to a first embodiment of the present invention, in which view major characterizing parts are illustrated in an exploded state.
Figure 3:
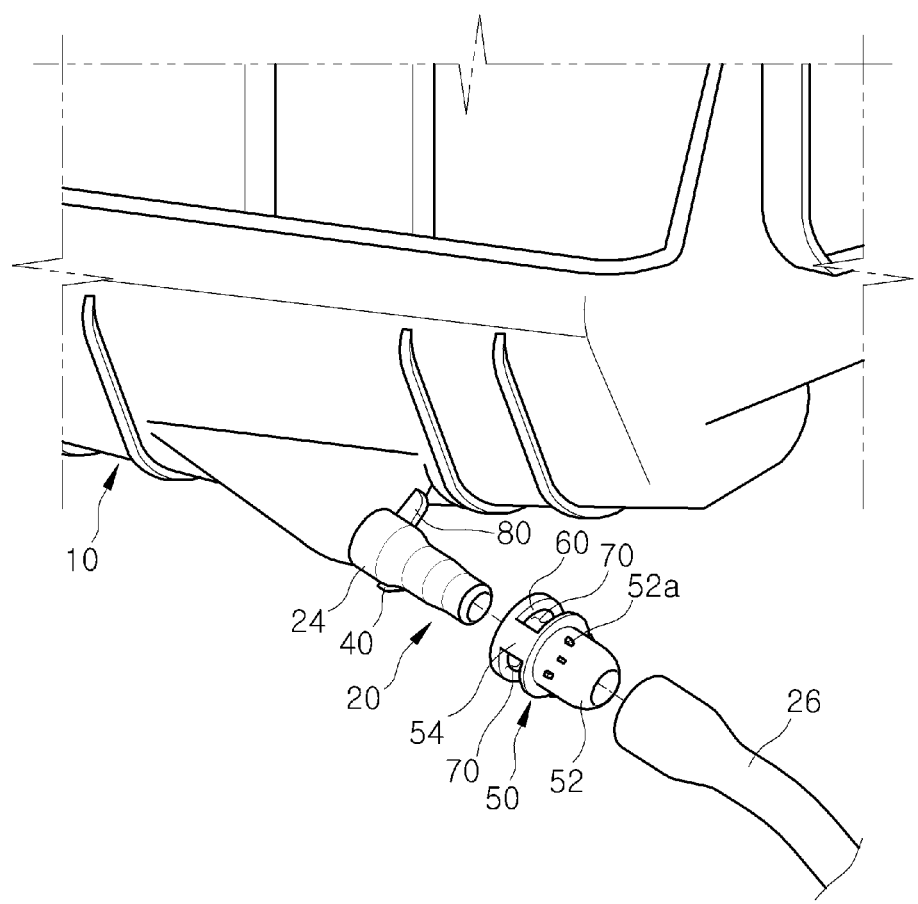
FIG. 3 is a perspective view illustrating the air conditioning system for motor vehicles according to the first embodiment of the present invention, in which view major characterizing parts are illustrated in an exploded state.

First, as illustrated in FIG. 2, the connector 50 is assembled with the drainage port 24 of the air conditioner case 10. In this case, the port connection portion 54 of the connector 50 is fitted to the drainage port 24 of the air conditioner case 10. Then, the rotation guiding rail 60 of the port connection portion 54 is slidably supported on the rotation guiding projection 40. The connector 50 thus assembled is rotatably connected to the drainage port 24 of the air conditioner case 10 so that the connector 50 can rotate around the drainage port 24.

After the assembly of the connector 50 with the drainage port 24 is completed, the drainage hose 26 is assembled with the connector 50. In this case, the base end portion 26a of the drainage hose 26 is fitted to the hose connection portion 52 of the connector 50. In the process of assembling the drainage hose 26 with the connector 50, the coupling projections 52a of the connector 50 cut into the inner circumferential surface of the drainage hose 26 and engage with the inner circumferential surface of the drainage hose 26. Thus, drainage hose 26 and the hose connection portion 52 of the connector 50 are assembled with a high coupling force.

After the assembly of the drainage hose 26 with the connector 50 is completed, as illustrated in FIG. 5, the terminal end portion of the drainage hose 26 is inserted into the through-hole 32 of the dashboard 30 and is drawn out to the outside of the vehicle room. Then, the drainage hose 26 is pulled outward. Thus, the drainage hose 26 kept in a slackened state within the vehicle room is stretched to the outside of the vehicle room, whereby the drainage hose 26 tensely extends from the inside of the vehicle room to the outside thereof.

If the drainage hose 26 is twisted in the process of pulling the drainage hose 26, the drainage hose 26 and the connector 50 rotate with respect to the drainage port 24 of the air conditioner case 10, thereby actively untwisting the drainage hose 26. As a result, it is possible to reliably prevent a twisting phenomenon of the drainage hose 26.

According to the air conditioning system configured as above, the drainage hose 26 is rotatably assembled with the air conditioner case 10. Thus, it is possible to actively cope with a situation where the drainage hose 26 is twistingly rotated in the process of drawing out and assembling the drainage hose 26 outside the vehicle room.

Furthermore, since it is possible to actively cope with the situation where the drainage hose is twistingly rotated in the process of drawing out and assembling the drainage hose outside the vehicle room, it is possible to reliably prevent a twisting phenomenon of the drainage hose 26 which may otherwise be generated when the drainage hose 26 is twistingly rotated in the process of assembling the drainage hose 26.

In addition, since it is possible to prevent the twisting phenomenon of the drainage hose 26 in the process of assembling the drainage hose 26, it is possible to reliably prevent a clogging phenomenon of the drainage hose 26 attributable to the twist of the drainage hose 26 and the resultant leakage of condensate water.

Second Embodiment

Next, an air conditioning system for motor vehicles according to a second embodiment of the present invention will be described with reference to FIGS. 8 to 15.

Figure 8:
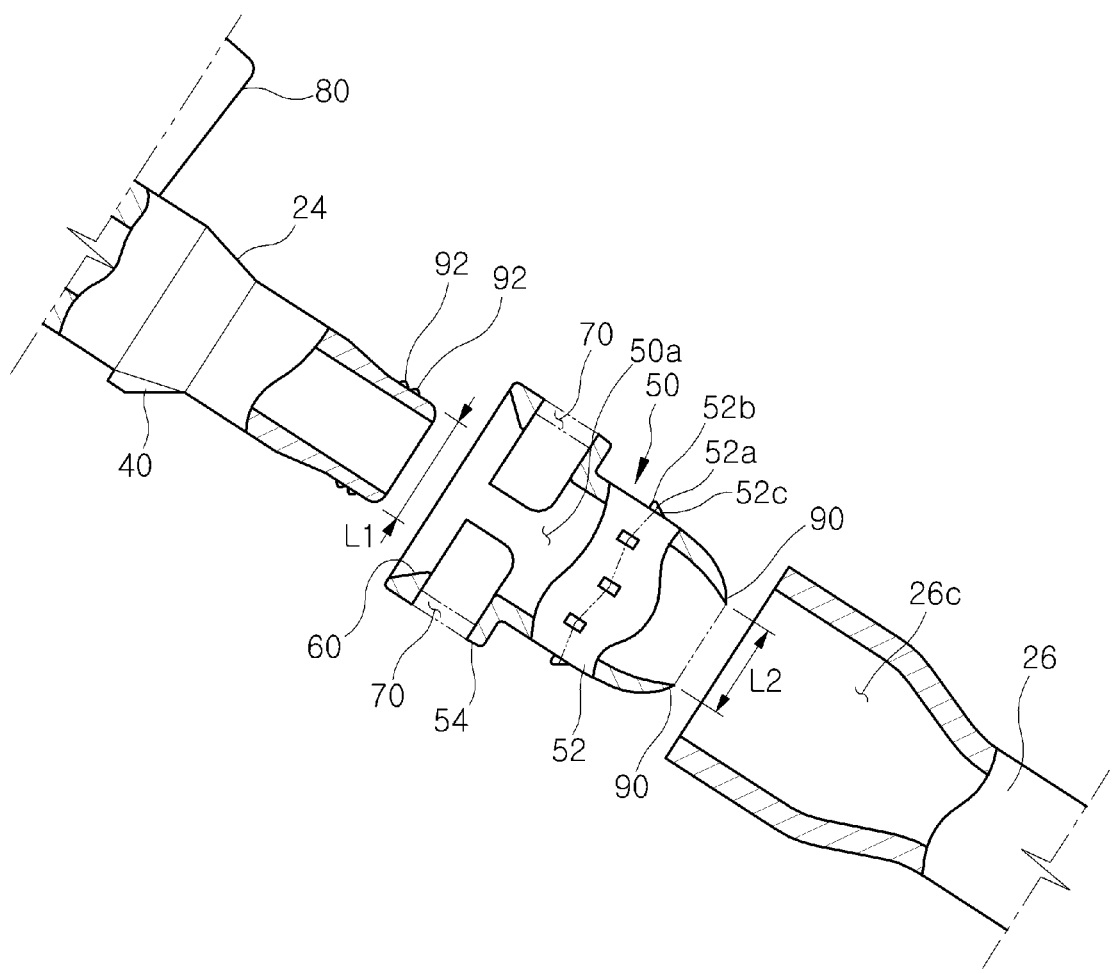
FIG. 8 is a sectional view illustrating an air conditioning system for motor vehicles according to a second embodiment of the present invention, in which view a drainage port, a connector, a drainage hose and a sealing means of the drainage port and the connector, as major characterizing parts of the second embodiment, are illustrated in an exploded state.
Figure 9:
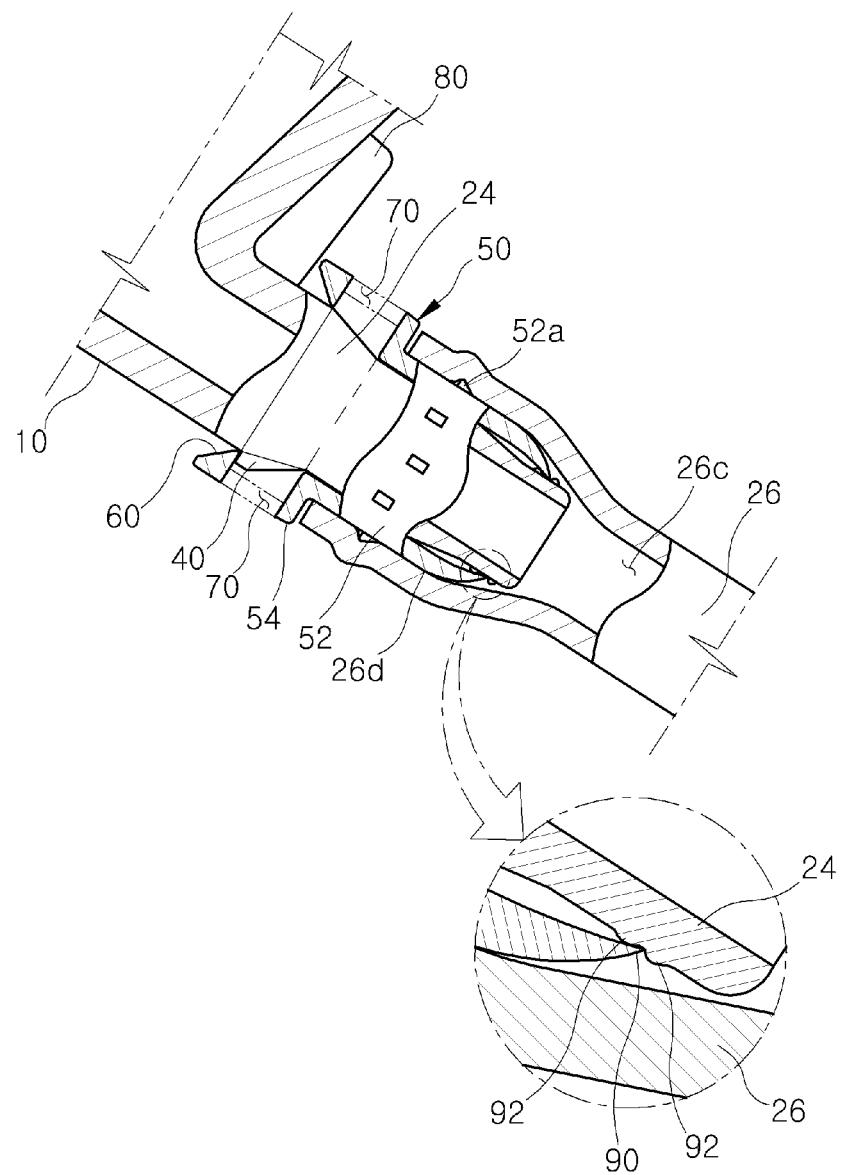
FIG. 9 is a sectional view illustrating a state in which the drainage port, the connector, the drainage hose and the sealing means illustrated in FIG. 8 are assembled together.

Referring first to FIGS. 8 and 9, the air conditioning system of the second embodiment is identical in basic configuration with the air conditioning system of the first embodiment described above.

The air conditioning system of the second embodiment further includes a sealing means configured to water-tightly seal a gap between the drainage port 24 of the air conditioner case 10 and the connector 50 fitted to the drainage port 24.

The sealing means includes a terminal end portion 90 of the hose connection portion 52 of the connector 50, which makes contact with the outer circumferential surface of the drainage port 24, and protrusion portions 92 formed on the outer circumferential surface of the drainage port 24 in a corresponding relationship with the terminal end portion 90 of the hose connection portion 52.

The terminal end portion 90 of the hose connection portion 52 of the connector 50 is configured to make contact with the outer circumferential surface of the drainage port 24 when fitting the connector 50 to the outer circumferential surface of the drainage port 24. The terminal end portion 90 makes contact with the outer circumferential surface of the drainage port 24 along the circumferential direction.

The protrusion portions 92 protrude from the outer circumferential surface of the drainage port 24 in a corresponding relationship with the terminal end portion 90 of the connector 50. Specifically, the protrusion portions 92 protrude in an annular shape along the outer circumferential surface of the drainage port 24 with which the terminal end portion 90 of the connector 50 makes contact.

The protrusion portions 92 make contact with the terminal end portion 90 of the connector 50. Thus, the protrusion portions 92 eliminates a clearance which may otherwise exist between the outer circumferential surface of the drainage port 24 and the terminal end portion 90 of the connector 50. Consequently, the protrusion portions 92 water-tightly seal a gap between the outer circumferential surface of the drainage port 24 and the terminal end portion 90 of the connector 50, thereby enhancing the water-tightness between the drainage port 24 and the connector 50. It is therefore possible to prevent condensate water from being leaked through between the drainage port 24 and the connector 50.

In this regard, the protrusion portions 92 protruding from the outer circumferential surface of the drainage port 24 are formed in a pair so as to interpose the terminal end portion 90 of the connector 50 therebetween. Specifically, the protrusion portions 92 are formed on the drainage port 24 at the inner side and outer side of the connector 50 with respect to the terminal end portion 90 interposed between the protrusion portions 92.

The protrusion portions 92 are arranged at the opposite sides of the terminal end portion 90 of the connector 50 so as to improve the water-tightness between the outer circumferential surface of the drainage port 24 and the terminal end portion 90 of the connector 50. It is therefore possible to maximize an effect of preventing leakage of condensate water through between the drainage port 24 and the connector 50.

It is preferred that the protrusion portions 92 of the drainage port 24 are burrs formed on the outer circumferential surface of the drainage port 24 by the terminal end portion 90 of the hose connection portion 52 when the terminal end portion 90 of the hose connection portion 52 of the connector 50 is pressed against the outer circumferential surface of the drainage port 24 and then the connector 50 is rotated.

When pressing the terminal end portion 90 of the connector 50 against the outer circumferential surface of the drainage port 24 in order to form the burrs as the protrusion portions 92, it may be possible to manually press the terminal end portion 90 of the connector 50 against the outer circumferential surface of the drainage port 24.

However, it is preferred that the inner diameter L2 of the terminal end portion 90 of the connector 50 is set smaller than the outer diameter L1 of the drainage port 24 so that the terminal end portion 90 of the connector 50 is naturally pressed against the outer circumferential surface of the drainage port 24 in the process of fitting the connector 50 to the outer circumferential surface of the drainage port 24.

The protrusion portions 92 of the drainage port 24 serve not only to improve the water-tightness between the drainage port 24 and the connector 50 but also to increase the coupling force of the drainage port 24 and the connector 50. Furthermore, the protrusion portions 92 serve to guide the rotational movement of the connector 50.

The protrusion portions 92 serve to additionally guide the rotational movement of the connector 50 in cooperation with the rotation guiding projection 40 and the rotation guiding rail 60 and serve to additionally couple the connector 50 with the drainage port 24. Accordingly, even when the rotation guiding projection 40 of the drainage port 24 and the rotation guiding rail 60 of the connector 50 are separated from each other, the protrusion portions 92 enable the connector 50 to smoothly rotate with respect to the drainage port 24 while maintaining the coupling of the drainage port 24 and the connector 50.

The protrusion portions 92 of the drainage port 24 may not be formed of the burrs mentioned above but may be formed of protrusion ribs integrally formed with the drainage port 24 when injection-molding the drainage port 24.

Similar to the burr-type protrusion portions 92 described above, the rib-type protrusion portions 92 protrude from the outer circumferential surface of the drainage port 24 and make contact with the terminal end portion 90 of the connector 50, thereby improving the water-tightness between the outer circumferential surface of the drainage port 24 and the terminal end portion 90 of the connector 50. This makes it possible to prevent leakage of condensate water through between the drainage port 24 and the connector 50.

Figure 10:
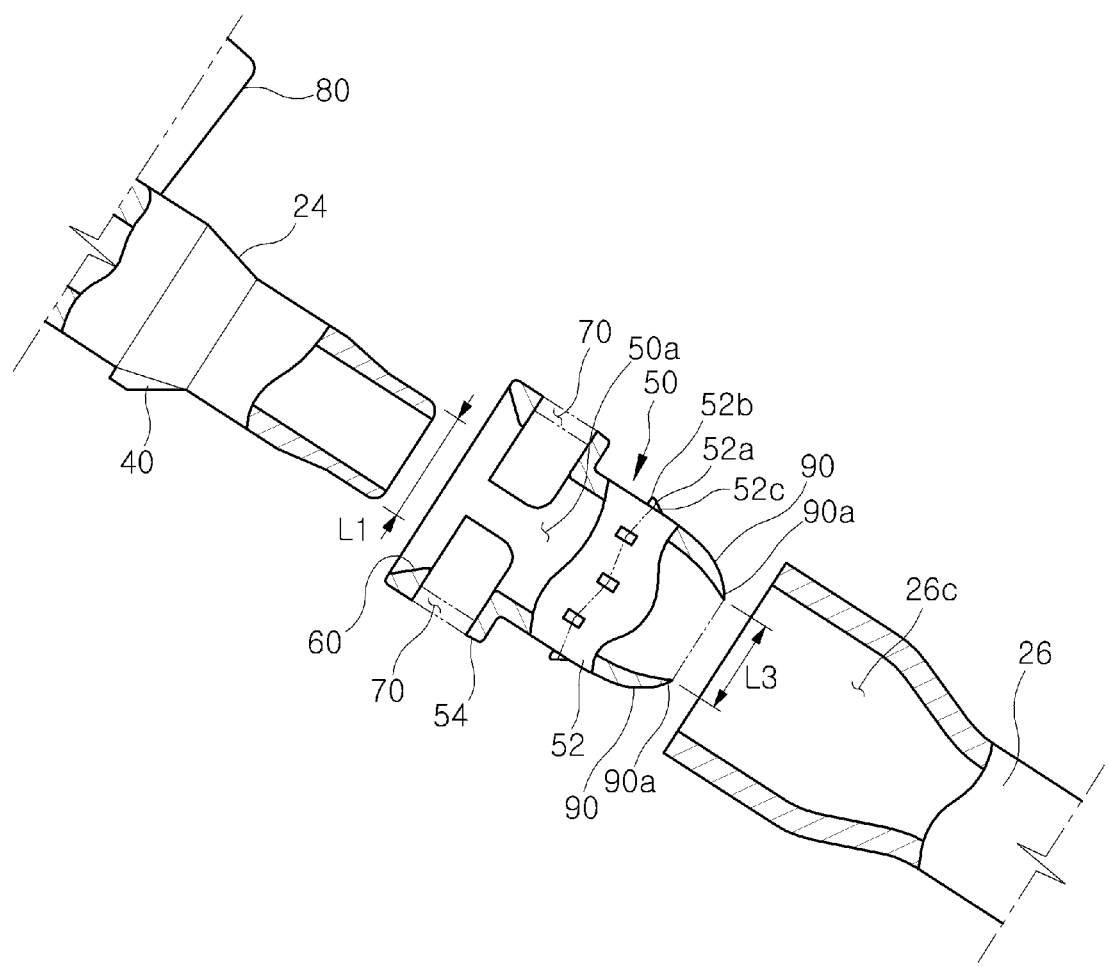
FIG. 10 is a sectional view illustrating a first modification of the sealing means of the air conditioning system according to the second embodiment, in which view the drainage port, the connector, the drainage hose and the sealing means are illustrated in an exploded state.
Figure 11:
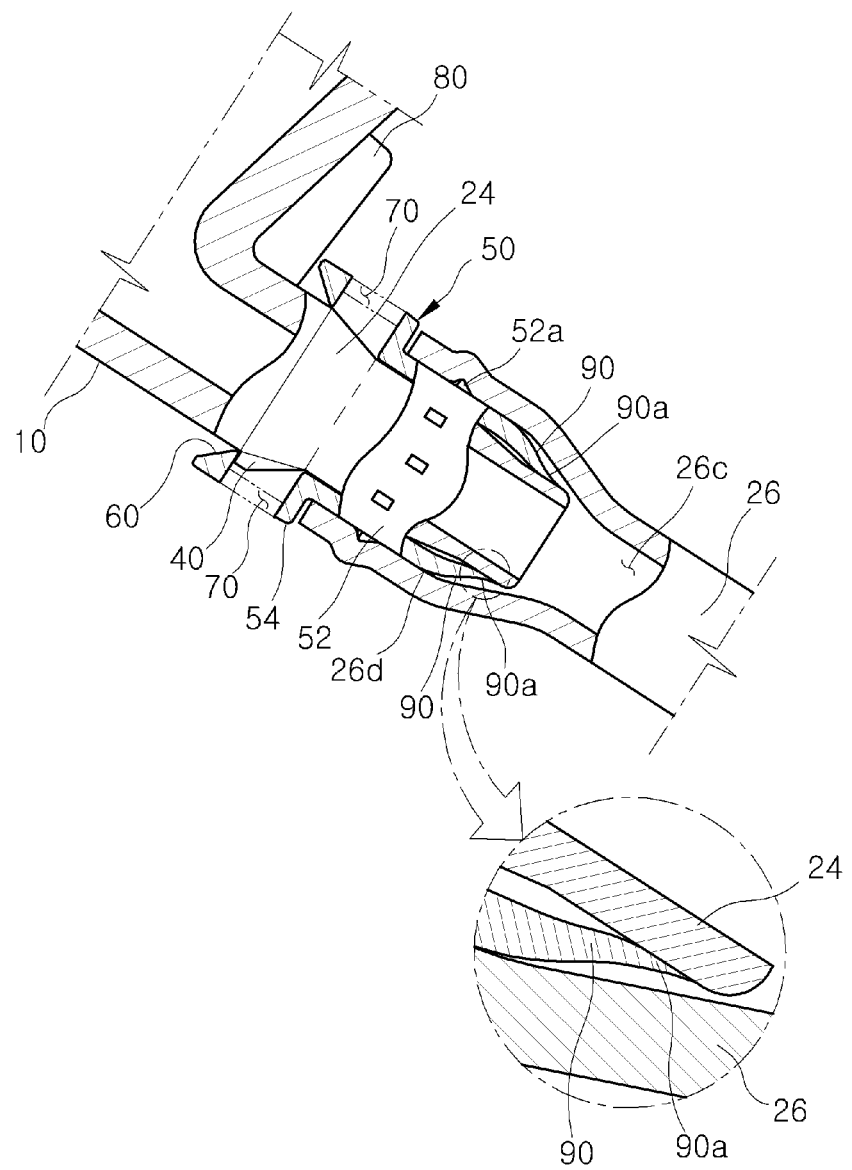
FIG. 11 is a sectional view illustrating a state in which the drainage port, the connector, the drainage hose and the sealing means illustrated in FIG. 10 are assembled together.

Referring next to FIGS. 10 and 11, there is illustrated a first modification of the sealing means for sealing a gap between the drainage port 24 and the connector 50.

The sealing means of the first modification includes a terminal end portion 90 of the hose connection portion 52 of the connector 50, which is configured to water-tight contact with the outer circumferential surface of the drainage port 24. The terminal end portion 90 of the hose connection portion 52 of the connector 50 includes a freely-deformable flexural deformation portion 90a having a thickness smaller than the thickness of the remaining portion of the terminal end portion 90.

The flexural deformation portion 90a of the connector 50 is configured to make water-tight contact with the outer circumferential surface of the drainage port 24 when fitting the connector 50 to the drainage port 24. Specifically, the flexural deformation portion 90a makes water-tight contact with the outer circumferential surface of the drainage port 24 along the circumferential direction. Thus, the flexural deformation portion 90a water-tightly seals a gap between the outer circumferential surface of the drainage port 24 and the terminal end portion 90 of the connector 50. Accordingly, the flexural deformation portion 90a enhances the air-tightness between the drainage port 24 and the connector 50, thereby preventing leakage of condensate water through between the drainage port 24 and the connector 50.

The flexural deformation portion 90a should not apply an excessive pressing force to the outer circumferential surface of the drainage port 24 when making water-tight contact with the outer circumferential surface of the drainage port 24. The reason is that if the flexural deformation portion 90a applies an excessive pressing force to the outer circumferential surface of the drainage port 24, the rotation of the connector 50 may be hindered.

It is preferred that the inner diameter L3 of the flexural deformation portion 90a is set smaller than the outer diameter L1 of the drainage port 24. The reason is that if the inner diameter L3 of the flexural deformation portion 90a is smaller than the outer diameter L1 of the drainage port 24, the flexural deformation portion 90a of the connector 50 can naturally make surface-to-surface contact with the outer circumferential surface of the drainage port 24 in the process of fitting the connector 50 to the outer circumferential surface of the drainage port 24.

Figure 12:
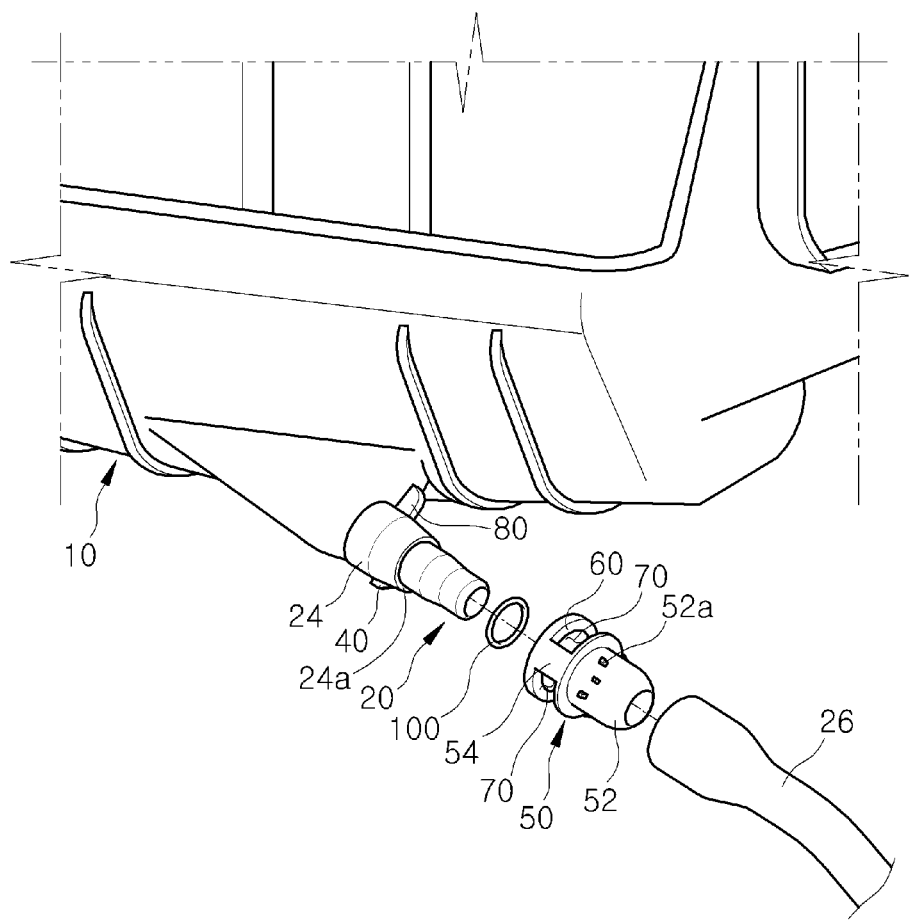
FIG. 12 is a sectional view illustrating a second modification of the sealing means of the air conditioning system according to the second embodiment, in which view a drainage port, a connector, a drainage hose and a sealing means are illustrated in an exploded state.
Figure 13:
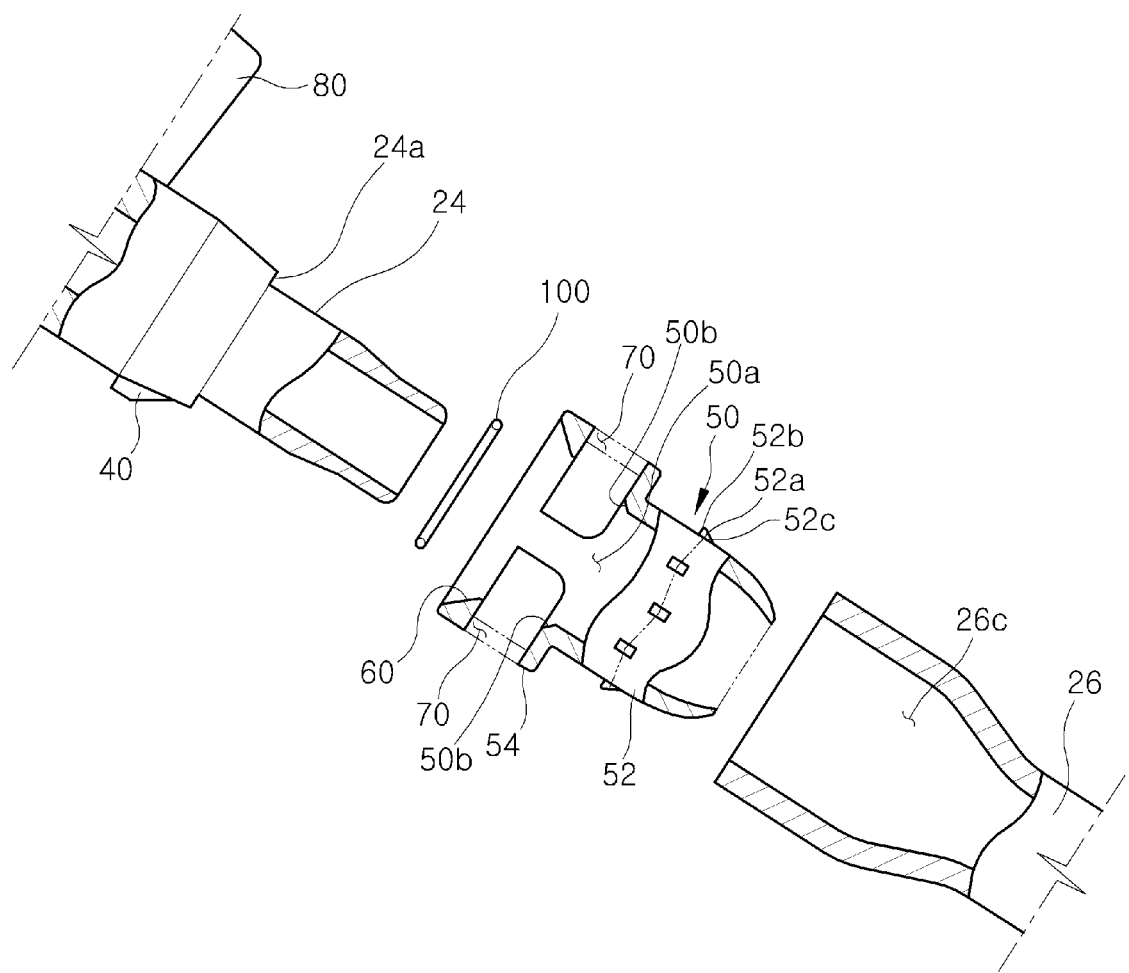
FIG. 13 is a sectional view illustrating the second modification of the sealing means of the air conditioning system according to the second embodiment, in which view the drainage port, the connector, the drainage hose and the sealing means are illustrated in an exploded state.
Figure 14:
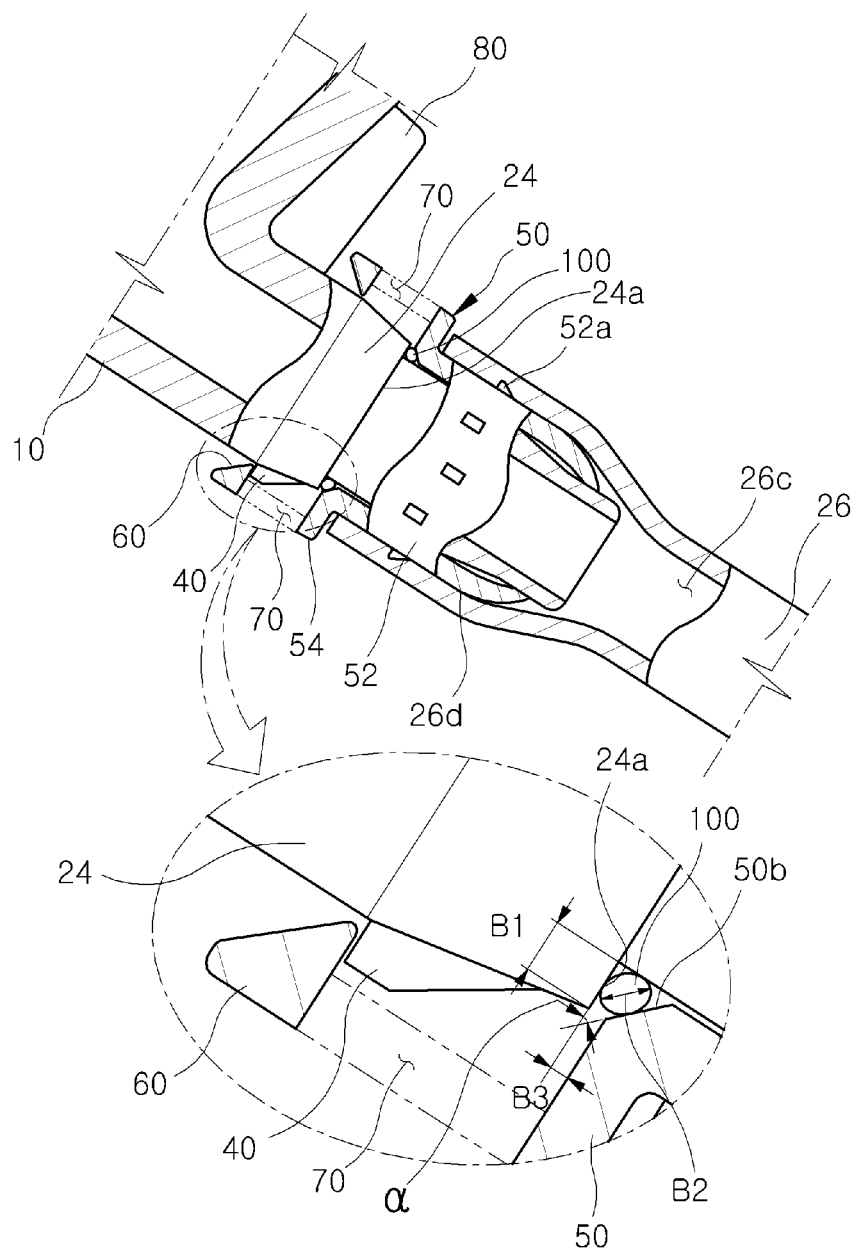
FIG. 14 is a sectional view illustrating a state in which the drainage port, the connector, the drainage hose and the sealing means illustrated in FIG. 13 are assembled together.

Referring next to FIGS. 12 to 14, there is illustrated a second modification of the sealing means for sealing a gap between the drainage port 24 and the connector 50.

The sealing means of the second modification includes an O-ring 100 installed between the outer circumferential surface of the drainage port 24 and the inner circumferential surface of the connector 50.

As illustrated in FIG. 14, the O-ring 100 is fitted to the outer circumferential surface of the drainage port 24. One side surface of the O-ring 100 is supported by a shoulder surface 24a formed on the outer circumferential surface of the drainage port 24 and the other side surface of the O-ring 100 elastically makes contact with a ring-holding surface 50b of the connector 50.

The O-ring 100 configured as above water-tightly seals a gap between the drainage port 24 and the connector 50, thereby enhancing the water-tightness between the drainage port 24 and the connector 50. This prevents condensate water from being leaked through between the drainage port 24 and the connector 50 when the condensate water is discharged from the drainage port 24 to the drainage hose 26.

The O-ring 100 is installed between the drainage port 24 and the connector 50 in a position corresponding to the opening portions 70 of the connector 50. This enables a worker to visually recognize the installation state of the O-ring 100 through the opening portions 70 of the connector 50. With this configuration, it is possible to inspect the assembly state, the wear state and the damage or breakage of the O-ring 100.

The shoulder surface 24a of the drainage port 24, which supports one side surface of the O-ring 100, is formed to make a right angle with respect to the outer circumferential surface of the drainage port 24. The shoulder surface 24a has a height B1 larger than the diameter B2 of the O-ring 100. For example, the height B1 of the shoulder surface 24a is 1.5 times as large as the diameter B2 of the O-ring 100. The reason for employing this configuration is to prevent removal of the O-ring 100 from the shoulder surface 24a of the drainage port 24.

In addition, the ring-holding surface 50b of the connector 50 making contact with the other side surface of the O-ring 100 is inclined with respect to the outer circumferential surface of the drainage port 24. The ring-holding surface 50b of the connector 50 inclined with respect to the outer circumferential surface of the drainage port 24 serves to press the O-ring 100 against the outer circumferential surface of the drainage port 24, thereby enhancing the air-tightness between the drainage port 24, the O-ring 100 and the connector 50.

It is preferred that the ring-holding surface 50b of the connector 50 corresponding to the shoulder surface 24a of the drainage port 24 is inclined to make a predetermined angle α with respect to the shoulder surface 24a of the drainage port 24. For example, the ring-holding surface 50b of the connector 50 may be inclined to make an angle falling within a range of about 30 to 45 degrees with respect to the shoulder surface 24a of the drainage port 24.

The reason for employing this configuration is to assure that the pressing forces applied to one side surface and the other side surface of the O-ring 100 by the drainage port 24 and the connector 50 do not act against each other. In a case where the pressing forces applied to one side surface and the other side surface of the O-ring 100 by the drainage port 24 and the connector 50 act against each other, the rotation of the connector 50 may be hindered.

Since the ring-holding surface 50b of the connector 50 is inclined with respect to the outer circumferential surface of the drainage port 24, the ring-holding surface 50b comes close to the shoulder surface 24a of the drainage port 24 in the portion thereof corresponding to the radial outer portion of the O-ring 100. The gap B3 between the shoulder surface 24a of the drainage port 24 and the portion of the ring-holding surface 50b closest to the shoulder surface 24a is set smaller than the diameter B2 of the O-ring 100. For example, the gap B3 may be set to become equal to ⅓ of the diameter B2 of the O-ring 100. The reason for employing this configuration is to prevent the O-ring 100 from being removed from the gap between the ring-holding surface 50b of the connector 50 and the shoulder surface 24a of the drainage port 24.

Figure 15:
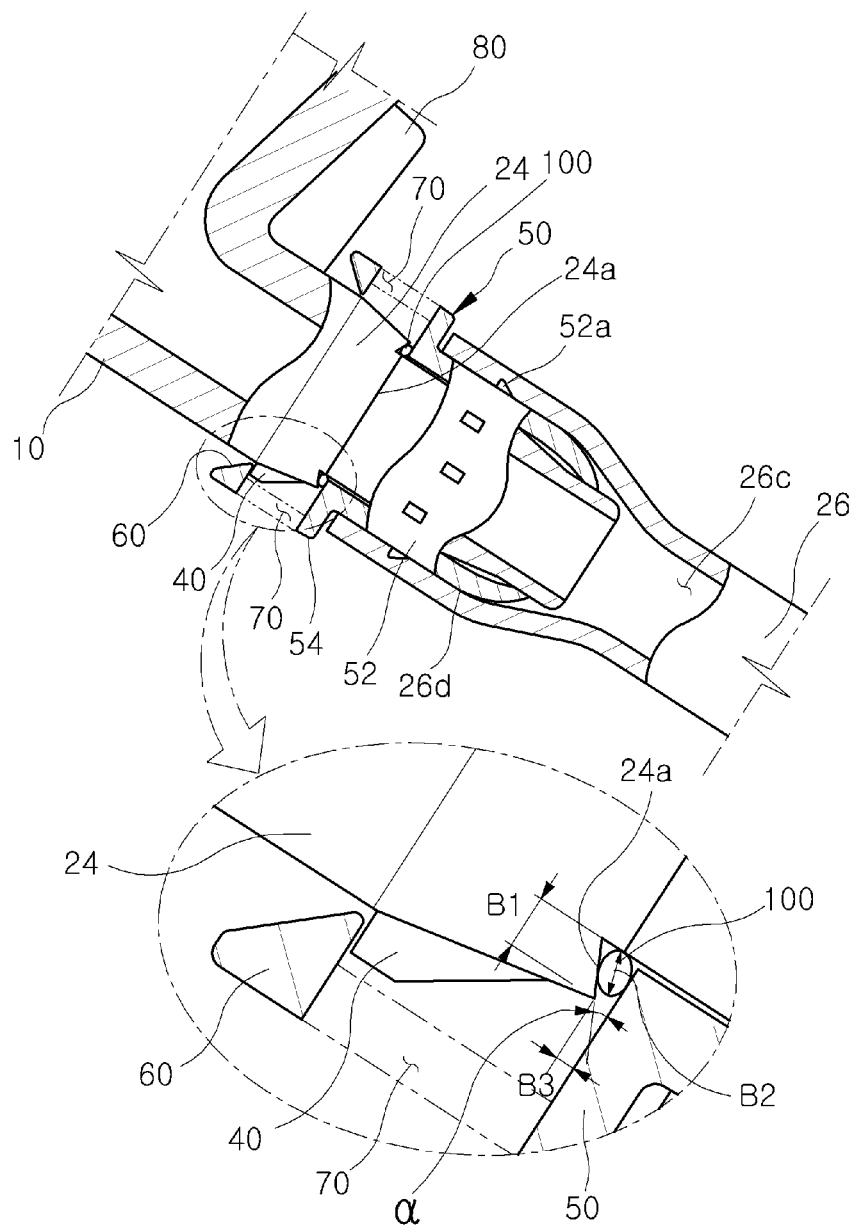
FIG. 15 is a sectional view illustrating a third modification of the sealing means of the air conditioning system according to the second embodiment.
Figure 16:
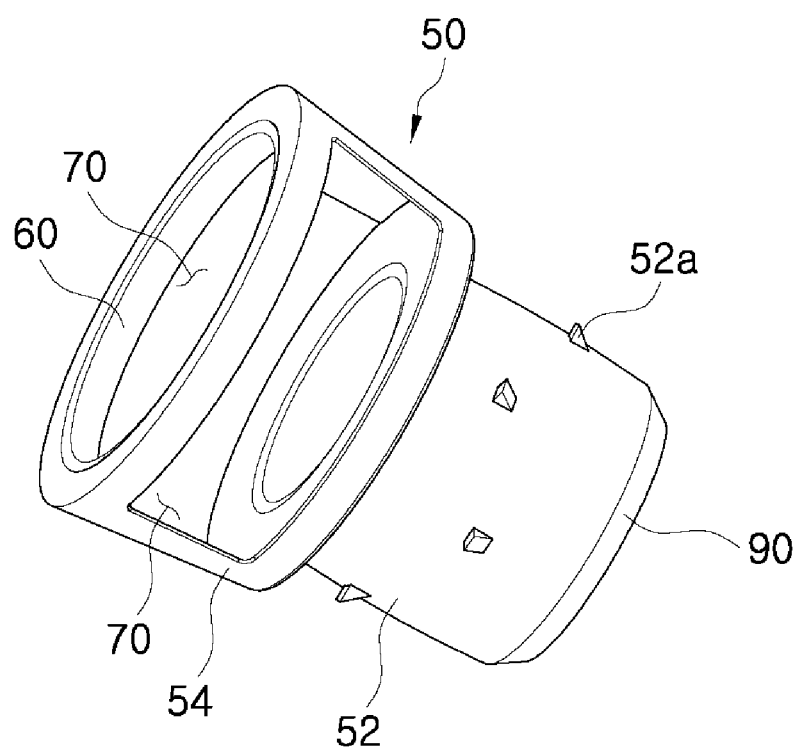
FIG. 16 is a perspective view showing an opening portion of a connector in the air conditioning system of the present invention.

Referring next to FIG. 15, there is illustrated a third modification of the sealing means for sealing a gap between the drainage port 24 and the connector 50.

The sealing means of the third modification differs from the sealing means of the second modification in terms of the structures of the connector 50 and the drainage port 24 for installing the O-ring 100.

Specifically, in the sealing means of the second modification, the shoulder surface 24a of the drainage port 24 is formed to make a right angle with respect to the outer circumferential surface of the drainage port 24, and the ring-holding surface 50b of the connector 50 is inclined.

In contrast, in the sealing means of the third modification, the shoulder surface 24a of the drainage port 24 is inclined with respect to the outer circumferential surface of the drainage port 24, and the ring-holding surface 50b of the connector 50 makes a right angle with the outer circumferential surface of the drainage port 24.

The shoulder surface 24a of the drainage port 24 and the ring-holding surface 50b of the connector 50 employed in the sealing means of the third modification are opposite in shape and structure to those employed in the sealing means of the second modification. However, the function and operation of the shoulder surface 24a of the drainage port 24 and the ring-holding surface 50b of the connector 50 employed in the sealing means of the third modification are the same as those of the second embodiment.

According to the air conditioning system of the second embodiment configured as above, the drainage hose 26 is rotatably fitted to the drainage port 24 through the use of the connector 50. The connection region of the drainage port 24 and the connector 50, from which condensate water may be leaked, is water-tightly sealed by the sealing means. It is therefore possible to reliably prevent leakage of condensate water through between the drainage port 24 and the connector 50.

Third Embodiment

Figure 17:
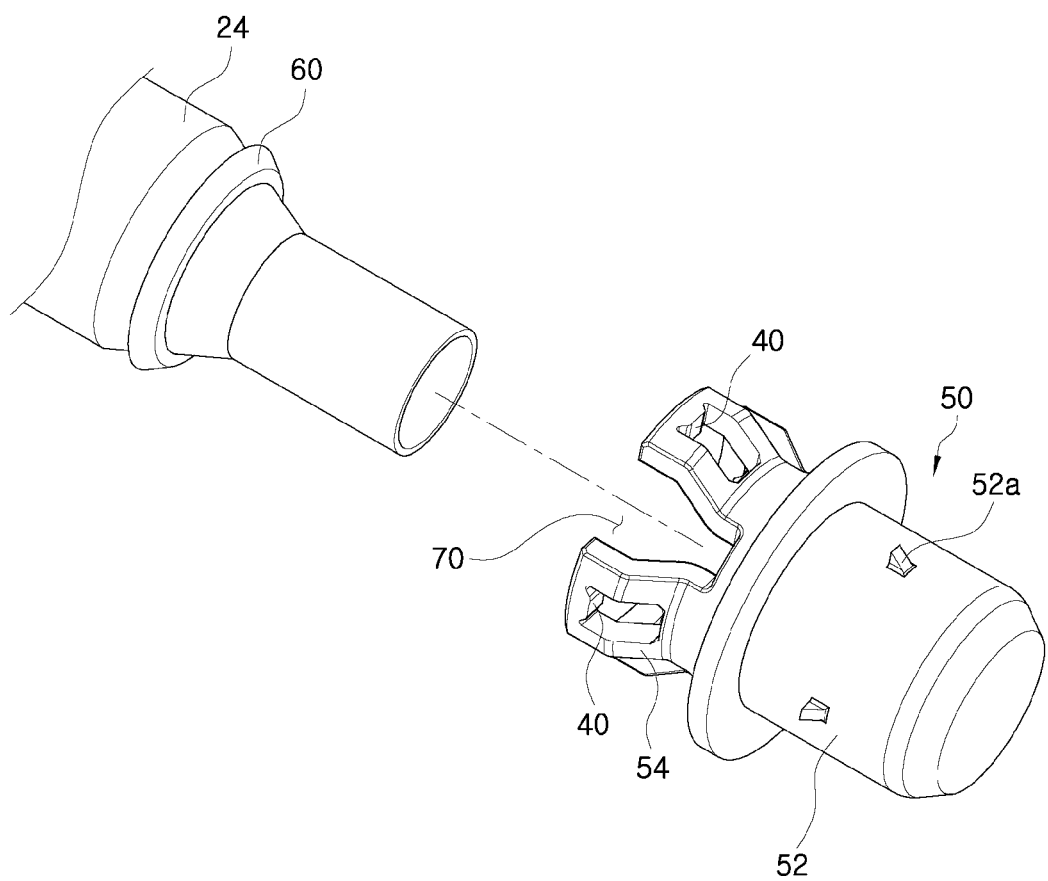
FIG. 17 is a perspective view showing an air conditioning system for motor vehicles according to a third embodiment of the present invention, in which a drainage port and a connector are exploded.
Figure 18:
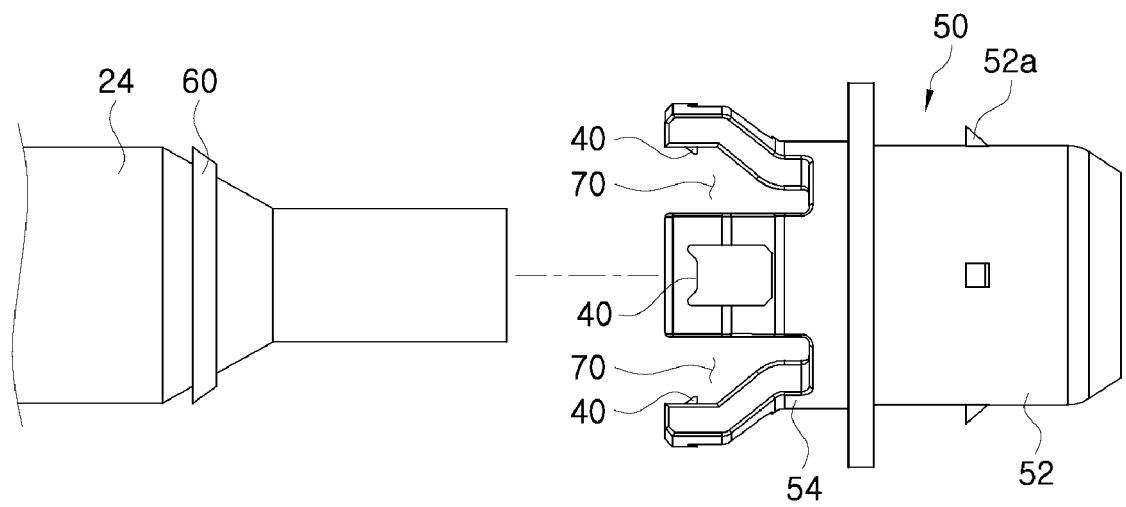
FIG. 18 is a side view of the air conditioning system shown in FIG. 17.

Next, an air conditioning system for motor vehicles according to a third embodiment of the present invention will be described with reference to FIGS. 17 and 18.

The air conditioning system according to the third embodiment has the same basic configuration as those of the air conditioning systems according to the first and second embodiments described above.

The air conditioning system according to the third embodiment differs from the air conditioning systems according to the first and second embodiments in terms of the positions of the rotation guiding projection 40 and the rotation guiding rail 60 for rotatably connecting the drainage port 24 and the connector 50.

That is to say, in the air conditioning system according to the third embodiment, the rotation guiding projection 40 is formed on the inner circumferential surface of the connector 50, and the rotation guiding rail 60 is formed on the outer circumferential surface of the drainage port 24.

The rotation guiding projection 40 is configured so that one side surface thereof makes contact with the rotation guiding rail 60 when coupling the connector 50 to the drainage port 24. The rotation guiding projection 40 is configured to rotate while making contact with the rotation guiding rail 60 only on one side surface thereof.

Preferably, the rotation guiding projection 40 and the rotation guiding rail 60 are configured so that when coupling the connector 50 to the drainage port 24, the rotation guiding projection 40 and the rotation guiding rail 60 engage with each other while making point-to-point contact with each other. The rotation guiding projection 40 and the rotation guiding rail 60 are configured to slide in the circumferential direction while making point-to-point contact with each other.

In the case where the drainage hose 26 is twisted during the coupling of the drainage hose 26, the rotation guiding projection 40 and the rotation guiding rail 60 make sliding movement with respect to each other, thereby allowing the connector 50 and the drainage hose 26 to rotate with respect to the drainage port 24. This makes it possible to prevent the drainage hose 26 from being twisted.

It is preferred that a plurality of rotation guiding projections 40 is formed along the inner circumferential surface of the connector 50.

Referring again to FIGS. 17 and 18, the air conditioning system according to the third embodiment includes a plurality of opening portions 70 formed by cutting a part of the connector 50. The shape of the opening portions 70 differs from that of the first and second embodiments.

That is to say, in the air conditioning system according to the third embodiment, the opening portions 70 are formed along the outer circumferential surface of the connector 50 at regular intervals between the rotation guiding projections 40.

Specifically, the opening portions 70 are formed on the outer circumferential surface of the connector 50 between the rotation guiding projections 40 and are opened toward the drainage port 24 from the inner portion of the connector 50.

The opening portions 70 permit elastic deformation of the connector 50 when the rotation guiding projections 40 and the rotation guiding rail 60 are coupled by connecting the connector 50 to the drainage port 24. This assists in coupling the rotation guiding projections 40 and the rotation guiding rail 60.

Furthermore, the opening portions 70 permit elastic deformation of the connector 50 when sliding movement occurs between the rotation guiding projections 40 and the rotation guiding rail 60 due to the rotation of the connector 50 with respect to the drainage port 24. This assists the sliding movement between the rotation guiding projections 40 and the rotation guiding rail 60.

While some preferred embodiments of the present invention have been described above, the present invention is not limited to these embodiments. It is to be understood that various changes and modifications may be made without departing from the scope of the invention defined in the claims.

What is claimed is:

1. An air conditioning system for motor vehicles, comprising:
    an air conditioner case;
    an evaporator installed inside the air conditioner case;
    a drainage hose configured to discharge condensate water generated in the evaporator to an outside of a vehicle room, the drainage hose connected to a drainage port of the air conditioner case and drawn out to the outside of the vehicle room through a dashboard; and
    a connector part configured to rotatably connect the drainage hose to the drainage port of the air conditioner case,
    wherein the connector part includes a connector configured to connect the drainage hose to the drainage port, a rotation guiding projection formed in one of the drainage port and the connector, and a rotation guiding rail formed in the other of the drainage port and the connector and configured to circumferentially slidably engage with the rotation guiding projection while making point-to-point contact with the rotation guiding projection, and
    the rotation guiding projection and the rotation guiding rail are configured so that when the drainage hose is twisted in the course of coupling the drainage hose, the rotation guiding projection and the rotation guiding rail make sliding movement with each other to allow the connector and the drainage hose to rotate with respect to the drainage port,
    wherein the connector includes an opening portion formed by cutting out a portion of the connector, and the opening portion is configured to permit elastic deformation of the connector to assist sliding movement of the rotation guiding projection and the rotation guiding rail when the rotation guiding projection and the rotation guiding rail make sliding movement, and
    wherein the opening portion includes a pair of opening portions symmetrically formed on an outer circumferential surface of the connector.

2. The air conditioning system of claim 1, wherein the rotation guiding projection is formed in the drainage port, and the rotation guiding rail is formed in a portion of the connector corresponding to the rotation guiding projection.

3. The air conditioning system of claim 1, wherein the rotation guiding projection is formed in the connector, and the rotation guiding rail is formed in a portion of the drainage port corresponding to the rotation guiding projection.

4. The air conditioning system of claim 1, wherein the rotation guiding projection is formed on an outer circumferential surface of the drainage port, the connector is fastened to an end portion of the drainage hose and fitted to an outer surface of the drainage port so as to rotate along the rotation guiding projection, and the connector includes a port connection portion rotatably fitted to the outer surface of the drainage port, and an opening portion formed by cutting out a portion of the port connection portion around the rotation guiding rail.

5. The air conditioning system of claim 4, wherein the rotation guiding projection and the rotation guiding rail are configured so that when coupling the connector to the drainage port, the rotation guiding projection and the rotation guiding rail engage with each other while making point-to-point contact with each other, and wherein the rotation guiding projection and the rotation guiding rail are configured to slide in a circumferential direction while making point-to-point contact with each other.

6. The air conditioning system of claim 5, wherein a gap is formed between an inner circumferential surface of the port connection portion and the rotation guiding projection.

7. The air conditioning system of claim 6, wherein the connector includes a hose connection portion fitted to a bore of the drainage hose, and the hose connection portion includes a plurality of coupling projections formed on an outer circumferential surface of the hose connection portion and configured to engage with an inner circumferential surface of the drainage hose.

8. The air conditioning system of claim 7, wherein the hose connection portion of the connector includes a terminal end portion configured to make contact with the outer circumferential surface of the drainage port when the connector is fitted to the outer circumferential surface of the drainage port, a sealing part is provided to water-tightly seal a gap between the drainage port and the connector, and the sealing part is formed at the terminal end portion of the hose connection portion making contact with the outer circumferential surface of the drainage port.

9. The air conditioning system of claim 8, wherein the terminal end portion of the hose connection portion includes a freely-deformable flexural deformation portion having a thickness smaller than a thickness of the remaining portion of the terminal end portion.

10. The air conditioning system of claim 9, wherein an inner diameter of the flexural deformation portion is set smaller than an outer diameter of the drainage port.

11. An air conditioning system for motor vehicles, comprising:
an air conditioner case;
an evaporator installed inside the air conditioner case;
a drainage hose configured to discharge condensate water generated in the evaporator to an outside of a vehicle room, the drainage hose connected to a drainage port of the air conditioner case and drawn out to the outside of the vehicle room through a dashboard; and
a connector part configured to rotatably connect the drainage hose to the drainage port of the air conditioner case, wherein the connector part includes a connector configured to connect the drainage hose to the drainage port, a rotation guiding projection formed in one of the drainage port and the connector and configured to protrude from an outer circumferential direction of the drainage port or the connector, and a rotation guiding rail formed in the other of the drainage port and the connector and configured to circumferentially slidably engage with the rotation guiding projection while making point-to-point contact with the rotation guiding projection, and the rotation guiding projection and the rotation guiding rail are configured so that when the drainage hose is twisted in the course of coupling the drainage hose, the rotation guiding projection and the rotation guiding rail make sliding movement with each other to allow the connector and the drainage hose to rotate with respect to the drainage port, wherein the connector includes an opening portion formed by cutting out a portion of the connector, and the opening portion is configured to permit elastic deformation of the connector to assist sliding movement of the rotation guiding projection and the rotation guiding rail when the rotation guiding projection and the rotation guiding rail make sliding movement, and wherein the opening portion includes a plurality of opening portions formed along an outer circumferential surface of the connector and opened toward the drainage port from an inner side of the connector.

\* \* \* \* \*